United States Patent [19]

Shinohara et al.

[11] Patent Number: 5,619,107

[45] Date of Patent: Apr. 8, 1997

[54] SYSTEM FOR CONTROLLING ELECTRIC VEHICLE MOTOR

[75] Inventors: Sadao Shinohara; Masaharu Hosoda, both of Wako, Japan

[73] Assignee: Honda Giken Kogyo Kabushiki Kaisha, Tokyo, Japan

[21] Appl. No.: 501,962

[22] Filed: Jul. 13, 1995

[30] Foreign Application Priority Data

Jul. 13, 1994 [JP] Japan .................................. 6-161535

[51] Int. Cl.⁶ ...................................................... H02P 3/00
[52] U.S. Cl. ...................... 318/139; 318/759; 318/376; 320/1; 307/10.7; 307/326
[58] Field of Search ...................................... 318/139, 376, 318/375, 377–381, 759–762, 370–371; 320/1; 307/9.1, 10.1, 10.2, 109, 110, 326

[56] References Cited

U.S. PATENT DOCUMENTS

| | | | |
|---|---|---|---|
| 4,093,900 | 6/1978 | Plunkett | 318/370 |
| 4,352,049 | 9/1982 | Franz, Jr. | 318/370 |
| 5,034,669 | 7/1991 | Sako et al. | 318/376 |
| 5,294,874 | 3/1994 | Hessenberger et al. | 318/759 |
| 5,412,293 | 5/1995 | Minezawa et al. | 318/376 |
| 5,420,491 | 5/1995 | Kanzaki et al. | 318/727 |

FOREIGN PATENT DOCUMENTS

| | | |
|---|---|---|
| 63-29391 | 8/1988 | Japan . |
| 4165901 | 6/1992 | Japan . |
| 5184016 | 7/1993 | Japan . |

OTHER PUBLICATIONS

English language Abstracts of JP 5-184016 and 4-165901.

Primary Examiner—Brian Sircus
Attorney, Agent, or Firm—Lyon & Lyon

[57] ABSTRACT

A device for controlling an electric vehicle motor that optimally discharges a smoothing capacitor, connected to the input terminals of an inverter in accordance with the condition of an electric vehicle. The device includes a motor drive means, the smoothing capacitor connected in parallel with the motor drive means, switching means operating in connection with an operation switch operated by the vehicle operator, discharging means for discharging the smoothing capacitor, draw detecting means, and discharge restricting means. The system opens the switching means to shut off output from the battery and to discharge the smoothing capacitor when the switching means is open, but restricts discharging during a towing or drawing condition of the electric vehicle.

11 Claims, 6 Drawing Sheets

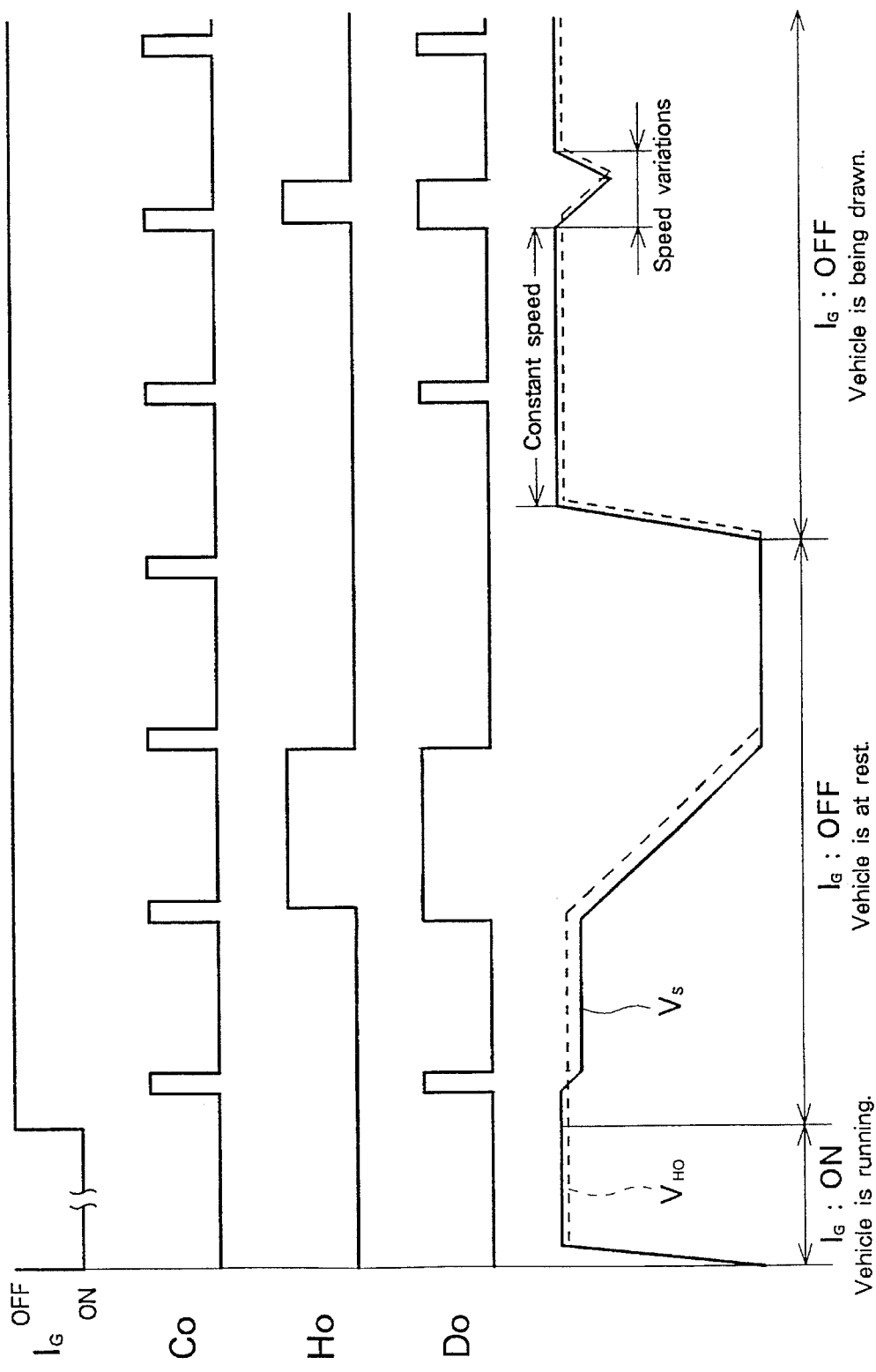

SYSTEM FOR CONTROLLING ELECTRIC VEHICLE MOTOR

BACKGROUND OF THE INVENTION

1. Field of the Invention

The present invention relates to a system for controlling an electric vehicle motor, which system optimally discharges a smoothing capacitor, connected to the input terminal of an inverter, in accordance with the condition of the electric vehicle.

2. Description of the Related Art

As disclosed in Laid Open No. Hei 4-165901 and Laid Open No. Hei 5-184016, conventional systems for controlling an electric vehicle motor are known to be arranged so that high DC power supply voltage (ranging, for example, from 150 to 300 V) generated by a plurality of batteries (e.g., lead-acid batteries) connected in series with each other is converted into AC power supply voltage (for example, AC voltage with three phases U, V, and W), using a DC-AC converter such as an inverter, following which conversion the resulting AC power supply voltage is supplied to a vehicle drive motor to drive a vehicle.

In conventional systems for controlling an electric vehicle motor, a large-capacity smoothing capacitor for compensating for variations in DC power supply voltage is inserted into the input terminals of inverters because DC power supply voltage on the input side of the inverters varies with AC power supply voltage output therefrom due to load variations involved in start-up, shutdown, and rapid acceleration and deceleration of the motor.

As described above, conventional systems for controlling an electric vehicle motor are arranged so that a smoothing capacitor inserted into the input terminals of inverters is used to supply stable DC power supply voltage to a vehicle drive motor even if the load applied to the motor varies.

Being arranged as described above, however, conventional systems for controlling an electric vehicle motor have a problem of the charge accumulated in their smoothing capacitors being left even after an operation switch operated by the driver, for example, an ignition switch is turned off, thereby stopping the electric vehicle, and thus the capacitors must wait to be spontaneously discharged when the systems undergo maintenance.

When a vehicle is at rest with the ignition switch thereof OFF, the charge in the large-capacity smoothing capacitor is no longer increased, and thus the voltage across the smoothing capacitor can be lowered by discharging the smoothing capacitor, using a discharging circuit, for example, a resistor.

When an electric vehicle is bein towed or drawn with the ignition switch thereof OFF, or when the ignition switch is turned off while the electric vehicle is running, regenerative effect accompanying the rotation of the vehicle drive motor may cause voltage on the input side through the inverter.

Since reducing the capacity of a discharging circuit for discharging the smoothing capacitor, which is charged as a result of continuous voltage occurrence at the input terminal of the inverter due to the regenerative effect lasting while the vehicle is towed or drawn, leads to heat generation from the discharging circuit, it is undesirable to discharge the smoothing capacitor when the vehicle is being towed or drawn.

On the other hand, increasing the capacity of the discharging circuit for the purpose of preventing heat generation causes an increase in cost.

SUMMARY OF THE INVENTION

It is an object of the present invention to provide a system for controlling an electric vehicle motor in an electric vehicle, which system optimally discharges a smoothing capacitor connected to the input terminal of an inverter in accordance with the condition of the electric vehicle, comprising motor drive means, the smoothing capacitor connected in parallel with the motor drive means, and discharging means operating in connection with switching means operated by the operator to discharge the smoothing capacitor, wherein the discharging means having draw detecting means for detecting the condition of the vehicle being drawn and discharge restricting means for restricting the activation of said draw detecting means when said draw detecting means detects the condition of the vehicle being drawn, whereby the condition of the vehicle being drawn to be exactly detected, and restricting discharge through a discharging circuit when the vehicle is drawn enables heat generation to be prevented without increasing the capacity of the discharging circuit.

It is still another object of the present invention to provide a system for controlling an electric vehicle motor, wherein discharging means includes voltage retaining means, slightly discharging means, voltage comparing means, and voltage controlling means, and detecting the condition of the vehicle at rest or being drawn using circuits so that the need for a specific detector and controlling means, such as a vehicle speed sensor is eliminated and discharge can securely be controlled by a simple arrangement.

It is a further object of the present invention to provide a system for controlling an electric vehicle motor, wherein discharging means includes a retained voltage reducing means, which system can drive the retained voltage reducing means based on the result of the comparison by voltage comparing means and make a change in the voltage of the voltage retaining means follow a change in the voltage across a smoothing capacitor to exactly detect the condition of draw, thereby restricting discharge even when an electric vehicle is drawn before discharge from the smoothing capacitor is completed.

As described above, the present invention can embody a system for controlling an electric vehicle motor, which system optimally discharges a smoothing capacitor, connected to the input terminal of an inverter, in accordance with the condition of an electric vehicle.

BRIEF DESCRIPTION OF SEVERAL VIEWS OF THE DRAWING

FIG. 6 is voltage waveform time chart of the main functional blocks of the discharge means shown in FIG. 5.

DETAILED DESCRIPTION

Figure 1:
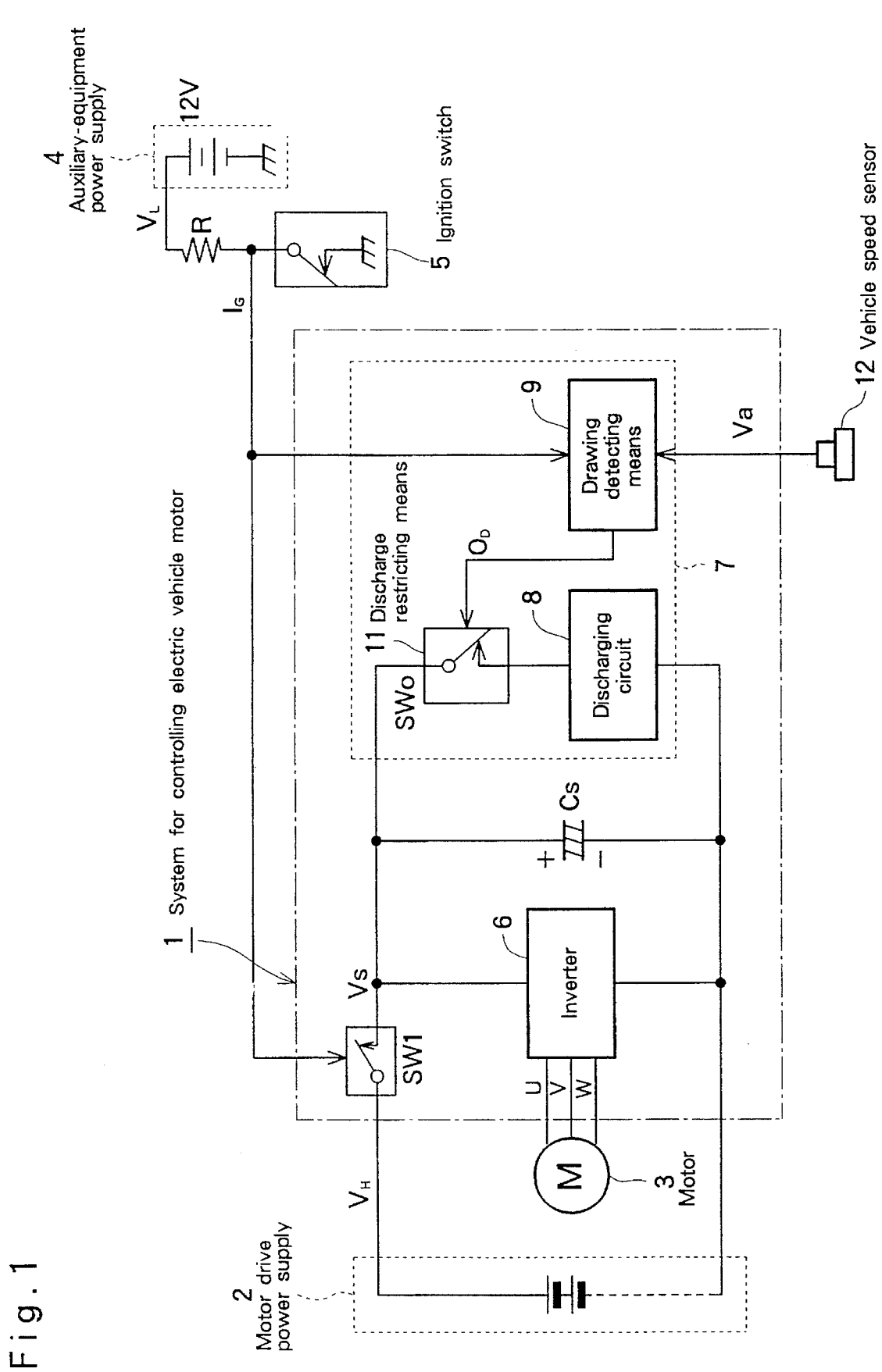
FIG. 1 is a block diagram of a first embodiment of a system for controlling an electric vehicle motor according to the present invention.

Referring now to the drawings, preferred embodiments of the present invention are described below.

In FIG. 1, a system 1 for controlling an electric vehicle motor comprises an inverter 6 constituting motor drive means which drives a motor 3 with power from a motor drive power supply 2 comprised of battery; a smoothing capacitor $C_s$, connected to the inverter 6, which smoothing capacitor smoothes the output from the motor drive power supply 2; a discharging means 7; and a switch SW1 comprising, for example, a large-current controlling relay, which operates in conjunction with an ignition switch 5 or an open-close switch operated by the vehicle operator.

The motor drive power supply 2, which is, for example, a plurality of rechargeable batteries, such as lead-acid cells, in a battery box on the electric vehicle, supplies high DC power supply voltage ($V_H$) for driving the motor 3.

The motor drive power supply 2 constitutes a floating power supply floating above the body ground of the electric vehicle.

The motor 3 consisting of, for example, a brushless motor for driving the drive wheels of the vehicle operates on an AC power supply voltage with three phases U, V, and W which is supplied from the inverter 6.

The system also includes an auxiliary-equipment power supply 4 consisting of one or more rechargeable batteries grounded to the body of the electric vehicle, which power supply supplies DC power supply voltage $V_L$, such as 12 V for driving the accessories and lights on the body and the ignition switch 5.

The operator operates the ignition switch 5 to control the start and stop of the electric vehicle, the ignition switch furnishing the system 1 with ON or OFF information $I_G$.

The inverter 6 converts high DC power supply voltage $V_H$ into AC power supply voltage with three phases U, V, and W to drive the motor 3, such as a brushless motor.

Figure 2:
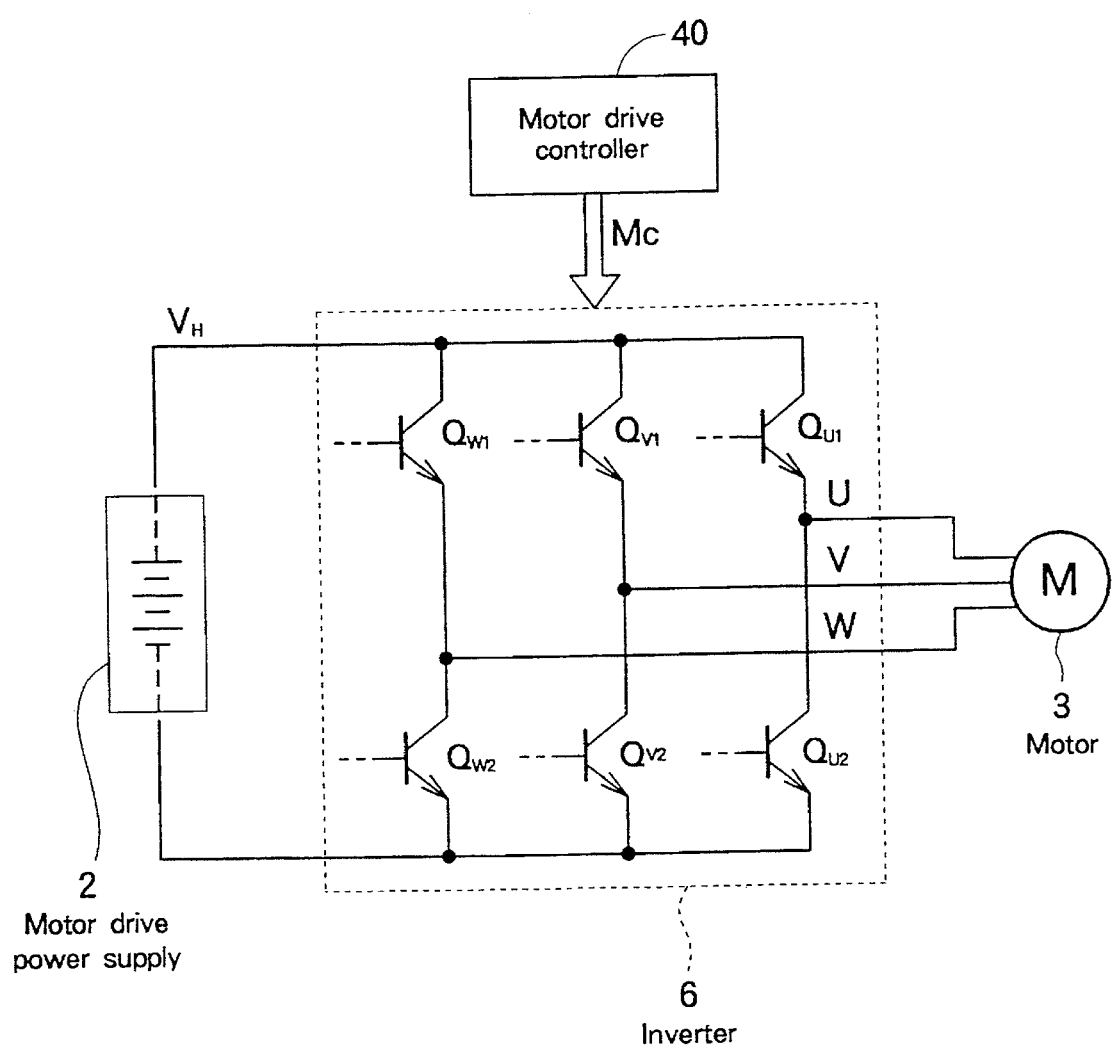
FIG. 2 is a circuit diagram of an embodiment of an inverter according to the present invention.

FIG. 2 shows a circuit diagram of an embodiment of an inverter according to the present invention.

The inverter 6, comprised of three pair of switching elements (combinations of transistors $Q_{u1}$ and $Q_{u2}$, $Q_{v1}$ and $Q_{v2}$, and $Q_{w1}$ and $Q_{w2}$), connected in series across the motor drive power supply 2, in parallel with each other, outputs AC power supply voltage with three phases U, V, and W from the emitters of transistors $Q_{u1}$, $Q_{v1}$, and $Q_{w1}$.

The bases of the transistors $Q_{u1}$, $Q_{u2}$, $Q_{v1}$, $Q_{v2}$, $Q_{w1}$, and $Q_{w2}$, which bases are under the PWM control by a controlling signal $M_c$ supplied from a motor drive controller 40, are arranged so that three-phase AC power of a pulse waveform matching the condition of the electric vehicle is fed to the motor 3.

The smoothing capacitor $C_s$, comprising capacitors with a large capacity and connected in parallel with the inverter 6, inhibits variations in the high DC power supply voltage $V_H$ and ripple elements thereof to supply stable DC power supply voltage to the inverter 6.

In FIG. 1, discharging means 7, including a discharging circuit 8, tow or draw detecting means 9, and discharge restricting means 11, is a discharging path for the smoothing capacitor $C_s$ and the discharging circuit 8. The discharging path is formed based on the OFF information $I_G$ furnished by the ignition switch 5 and discharges the smoothing capacitor $C_s$. When wheels of the electric vehicle are rotating with the ignition switch 5 OFF, for example, when the electric vehicle is being towed or drawn, the discharging means opens the discharging circuit 8, by using the discharge restricting means 11 to prevent discharge.

The discharging circuit 8, comprising, for example, a conventional resistor or a constant-current circuit discharges the smoothing capacitor $C_s$ to reduce the voltage $V_s$ thereacross when the switch SW1 is opened based on the OFF information $I_G$ from the ignition switch 5.

The tow or draw detecting means 9, comprising a logic circuit and a drive circuit, outputs draw information $O_D$ to a switch $SW_O$ (discharge restricting means 11) based on the OFF information $I_G$ (at a +12-V high H level in the embodiment of FIG. 1) from the ignition switch 5 and a vehicle speed signal Va (for example, at a high H level) from a vehicle speed sensor 12.

The switch $SW_O$ is closed based on draw information $O_D$ at a low (L) level to form the discharging path when the OFF information $I_G$ from the ignition switch 5 and the vehicle speed signal Va are, for example, at the H level and the L level (the vehicle at rest), respectively, and the switch $SW_O$ is opened based on the draw information $O_D$ at the H level to open the discharging path, thereby preventing discharge when the OFF information $I_G$ and vehicle speed signal Va are both at the H level (the vehicle is being towed or drawn).

The draw detecting means 9, including storing means and comparing means such as a comparator, is arranged so as to compare a value represented by the vehicle speed signal Va from the vehicle speed sensor 12 with a standard vehicle speed Vk preset in the storing means such as a ROM and, when the speed represented by the vehicle speed signal Va is higher than the standard vehicle speed Vk (Va≧Vk), feed a signal at the H level to the logic circuit.

In the discharge restricting means 11, comprising a one-break contact relay and the switch $SW_O$ with electronic contacts, the switch $SW_O$ is closed to form the discharging path when the draw information $O_D$ supplied from the draw detecting means 9 is at the L level, and the switch $SW_O$ is opened to open the discharge path when the draw information $O_D$ is at the H level.

Since the motor drive power supply 2 and the auxiliary-equipment power supply 4 are a floating arrangement and a body grounding arrangement, respectively, and accordingly, insulation is required to exercise control between these two power supplies, and further the switch SW1 and the switch $SW_O$ are arranged so that the controlling section and the controlled section are insulated from each other.

Referring now to FIG. 1, the operation of the system 1 for controlling an electric vehicle motor will be described. When the ignition switch 5 is turned on, so that the ON information $I_G$ (at the L level) of the ignition switch 5 is furnished to the switch SW1 (switching means) and the draw detecting means 9, the switch SW1 is closed to connect the motor drive power supply 2 to the inverter 6, and the switch $SW_O$ (discharge restricting means 11) is opened based on the draw information $O_D$ (at the H level) from the draw detecting means 9.

Then the high DC voltage $V_H$ is supplied to the inverter 6, which converts the high DC voltage $V_H$ into AC voltage with three phases (U, V, and W) and supplies the AC voltage to the motor 3 to drive it, and thus the electric vehicle starts to run.

When the electric vehicle is running, charge is accumulated in the smoothing capacitor $C_s$, so that the DC voltage $V_s$ thereacross is increased to the high DC voltage $V_H$ and maintained at that level to stabilize the supply of the high DC voltage $V_H$ to the inverter 6.

When the ignition switch 5 is turned off, and the OFF information (at the H level) on the ignition switch is furnished to the switch SW1 and the draw detecting means 9, the switch SW1 shuts off the high DC voltage $V_H$ supplied to the inverter 6, and the switch $SW_O$ connects the smoothing capacitor $C_s$ to the discharging circuit 8.

When the electric vehicle is at rest or running at a speed lower than the standard speed ($V_k$), the draw detecting means 9 furnishes to the switch $SW_O$ the draw information $O_D$ at the L level to keep the switch $SW_O$ closed, and thus the smoothing capacitor $C_s$ and the discharging circuit 8 are connected in parallel with each other to form the discharging path, through which the smoothing capacitor $C_s$ is rapidly discharged.

When the electric vehicle is being drawn at a speed, represented by the vehicle speed signal Va, which is higher than the standard vehicle speed $V_k$, even if the ignition switch 5 is OFF, the draw information $O_D$ at the H level is furnished from the draw detecting means 9 to the switch $SW_O$, so that the switch $SW_O$ is kept open, thus shutting off the discharging path to prevent the smoothing capacitor $C_s$ from being discharged.

Thus heat generation from the discharging circuit 8 is prevented, the heat generation being caused by releasing the charge which is continuously accumulated in the smoothing capacitor $C_s$ as the motor 3 exhibits the regenerative effect due to the towing or drawing.

When towing or drawing stops, the switch SW0 is closed to start discharge, and thus the smoothing capacitor $C_s$ is rapidly discharged.

As described above, the system 1 for controlling an electric vehicle motor can promptly discharge the smoothing capacitor $C_s$ when the electric vehicle is at rest or running at a speed lower than the predetermined speed $V_k$ with the ignition switch 5 OFF.

Figure 3:
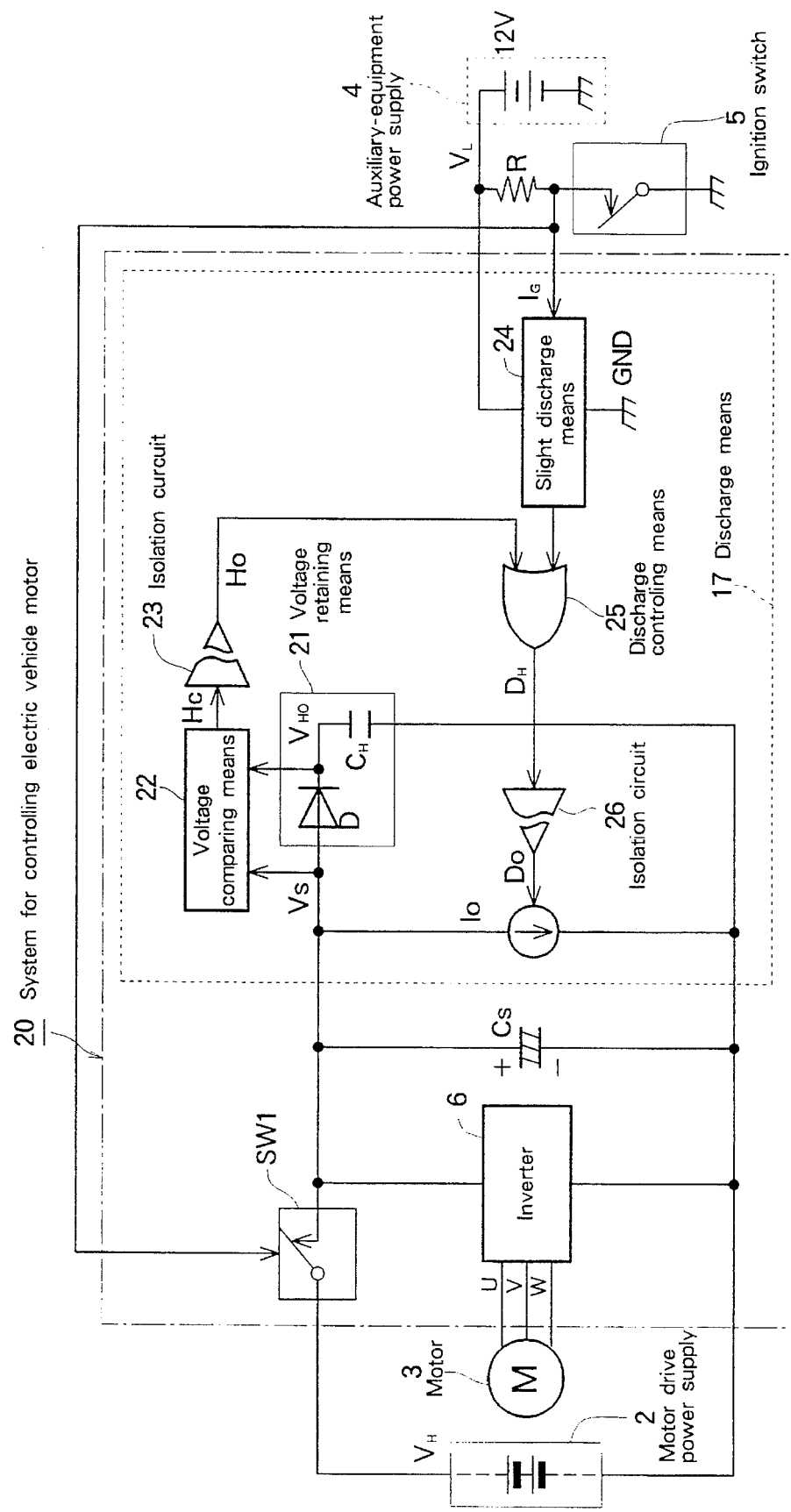
FIG. 3 is a block diagram of a second embodiment of a system for controlling an electric vehicle motor according to the present invention.

In the second embodiment of FIG. 3, a system 20 for controlling an electric vehicle motor basically differs from the system 1 of FIG. 1 only in that the former is arranged so as to determine from a change in charge (voltage $V_s$) in a smoothing capacitor $C_s$ whether or not the electric vehicle is being towed or drawn, while the latter uses the vehicle speed sensor 12.

The system 20 for controlling an electric vehicle motor includes a switch SW1, an inverter 6, a smoothing capacitor $C_s$, and discharging means 17.

The discharging means 17 comprises voltage retaining means 21, voltage comparing means 22, isolation circuits 23 and 26, slight discharge means 24, discharge controling means 25, and a constant-current circuit $I_O$.

The voltage retaining means 21, which comprises, for example, a series circuit consisting of a diode D and a capacitor $C_H$, retains the voltage $V_s$ across the smoothing capacitor $C_s$, which voltage takes place when the switch SW1 is opened by turning off an ignition switch 5, as a retained voltage $V_{HO}$ across the capacitor $C_H$ through the diode D.

The voltage comparing means 22, composed of a subtractor and a comparing circuit, such as a comparator, computes the deviation $\Delta V$ of the retained voltage $V_{HO}$ across the capacitor $C_H$ of the voltage retaining means 21 from the voltage $V_S$ across the smoothing capacitor $C_s$ ($\Delta V = V_{HO} - V_s$), which voltage $V_s$ is reduced as the constant-current circuit $I_O$ is discharged, and a comparing signal $H_c$ is output to the isolation circuit 23 when the deviation $\Delta V$ is higher than a predetermined voltage $V_{HS}$ ($\Delta V > V_{HS}$).

The isolation circuit 23, comprising a photocoupler or the like, converts a comparing signal $H_c$ based on floating high DC voltage $V_H$ into a comparing signal $H_O$ based on auxiliary-equipment voltage $V_L$ (12 V) for body grounding and supplies the comparing signal $H_O$ obtained to the discharge controling means 25.

The slight discharge means 24, comprising, for example, an intermittent timer (e.g., multivibrator) producing pulses of a relatively long period which are on short duty at the H level forms a slight discharge circuit which feeds a discharge controling signal $C_O$ (at the H level) to the discharge controling means 25 only during the period of duty at the H level, using as a trigger the OFF information $I_G$ which is furnished when the ignition switch 5 is turned off, to drive the constant-current circuit $I_O$ during the period of the discharge controling signal $C_O$, thereby performing such slight discharge that the constant-current circuit $I_O$ does not generate heat.

The discharge controling means 25, comprising, for example, an OR circuit, outputs a discharge drive signal $D_H$ to the isolation circuit 26 when the comparing signal $H_O$ (at the H level) or the discharge controling signal $C_O$ (at the H level) is input.

The isolation circuit 26, comprising a photocoupler or the like as in the isolation circuit 23, converts a discharge drive signal $D_H$ based on auxiliary-equipment voltage $V_L$ (12 V) for body grounding into a discharge drive signal $D_O$ based on floating high DC voltage $V_H$ and drives the constant-current circuit $I_O$ with the discharge drive signal $D_O$ to discharge the smoothing capacitor $C_s$ for the period of the discharge drive signal $D_O$, thereby reducing the voltage $V_s$ across the smoothing capacitor $C_s$.

The operation of the system 20 for controlling an electric vehicle motor, which system is shown in FIG. 3, now will be described.

When the ignition switch 5 is turned on, and the switch SW1 is closed, motor drive voltage ($V_H$) is supplied, and the inverter 6 operates to produce three-phase AC voltage, which drives the motor 3 and thus makes the electric vehicle run.

A charge is accumulated in the smoothing capacitor $C_s$, so that the voltage $V_s$ occurs, and the capacitor $C_H$ in the voltage retaining circuit 21 is maintained at the retaining voltage $V_{HO}$ which is lower than the voltage $V_s$ by the forward-direction voltage $V_D$ of the diode D, that is, $V_{HO} = V_s - V_D$.

Once the ignition switch 5 is turned off, so that the electric vehicle stops, the voltage $V_s$ and the retaining voltage $V_{HO}$ are, shortly after the switch SW1 is opened, maintained at the same values as when the electric vehicle is running.

On the other hand, when the ignition switch 5 is turned off, the OFF information $I_G$ triggers the outputting of the discharge controling signal $C_O$ from the slight discharge means 24, and the constant-current circuit $I_O$ is driven so as to perform slight discharge only while a first discharge controling signal $C_O$ is output through the discharge controling means 25 and the isolation circuit 26.

Although the slight discharge reduces the voltage $V_s$ across the smoothing capacitor $C_s$, both the voltage $V_s$ and the $V_{HO}$ are kept as they are, so that continuous discharge is not performed if the deviation $\Delta V$ of the retaining voltage $V_{HO}$ from the voltage $V_s$, or $V_{HO} - V_s$, does not exceed a predetermined voltage $V_{HS}$.

Then a second discharge controlling signal $C_O$ is output to perform discharge by driving the constant-current circuit $I_O$, and the voltage comparing means 22 outputs the comparing signal $H_c$ to drive the constant-current circuit $I_O$ through the discharge controling means 25, thereby causing continuous discharge if the deviation ΔV of the retaining voltage $V_{HO}$ from the voltage $V_s$ across the smoothing capacitor $C_s$, or $V_{HO}-V_s$, exceeds the predetermined voltage $V_{HS}$.

Along with this discharge the voltage $V_s$ further lowers, and accordingly, comparing signals $H_c$ continue to be outputed from the voltage comparing means 22, and discharge also continues.

Discharge continues until the voltage comparing means 22, the isolation circuit 23, or the constant-current circuit $I_O$ stops, and the voltage $V_s$ across the smoothing capacitor $C_s$ lowers sufficiently so that discharge stops.

The constant current $I_O$ produced by the constant-current circuit $I_O$ can be set to optimally determine how often the discharge controlling signal $C_O$ is generated before discharge is continued.

Since the voltage across the capacitor $C_H$ in the voltage retaining circuit 21, though reduced by spontaneous discharge, continues to be maintained at a relatively high retained voltage $V_{HO}$ after discharge stops, the system is arranged so that once a comparator or the like is used to check that the voltage $V_s$ across the smoothing capacitor $C_s$ is lowered to such a predetermined voltage (a few volts) that discharge may be stopped, the retained voltage $V_{HO}$ is reduced by discharging the capacitor $C_H$.

The capacity of the capacitor $C_H$ can be set low enough, and thus a resistor permitting low power may be merely used to discharge the capacitor.

For example when the electric vehicle is towed or drawn after the voltage $V_s$ across the smoothing capacitor $C_s$ is reduced enough so that discharge stops, voltage caused by the regenerative effect of the motor 3 also comes into being through the inverter 6 at the input terminal, and thus the smoothing capacitor $C_s$ is rapidly charged, so that the voltage $V_s$ across the smoothing capacitor $C_s$ rises to a voltage corresponding to the speed of rotation of the motor 3.

As the voltage $V_s$ across the smoothing capacitor $C_s$ is increased, the retained voltage $V_{HO}$ across the capacitor $C_H$ rises until it nearly equals the voltage $V_s$.

If the ignition switch 5 is OFF, the slight discharge means 24 continues to output the discharge controlling signal $C_O$ and thus drives the constant-current circuit $I_O$ to perform slight discharge only while the discharge controlling signal $C_O$ is output through the discharge controling means 25 and the isolation circuit 26; however, the voltage $V_s$ across the smoothing capacitor $C_s$ is not reduced at all or reduced only slightly because the smoothing capacitor $C_s$ continues to be charged due to the regenerative effect of the motor 3, and consequently, the deviation ΔV of the retained voltage $V_{HO}$ across the capacitor $C_H$ from the voltage $V_s$ across the smoothing capacitor $C_s$, i.e., $V_{HO}-V_s$, does not exceed the predetermined voltage $V_{HS}$, nor does continuous discharge occur, so that the discharging of the smoothing capacitor $C_s$ is limited.

Figure 4:
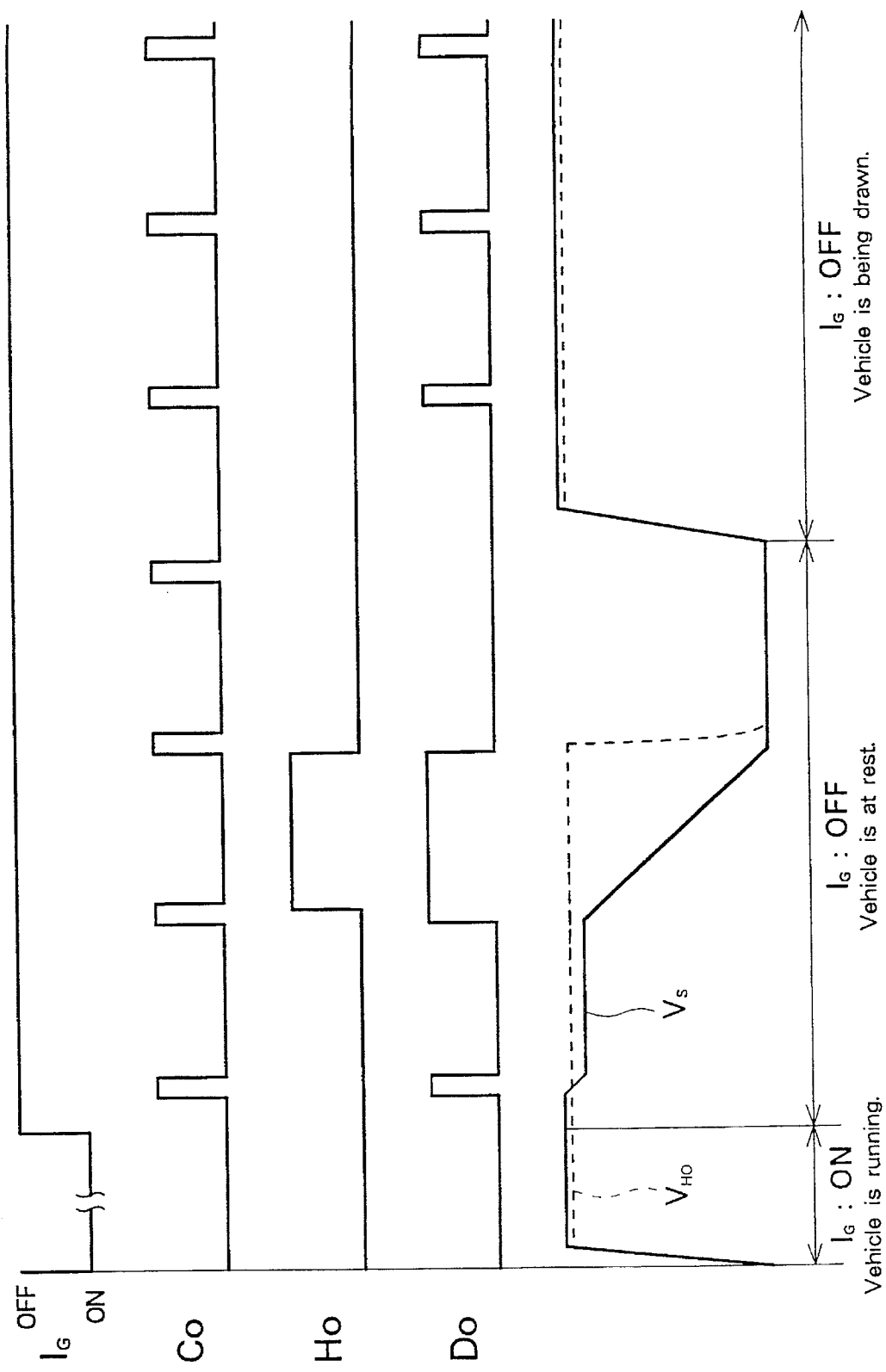
FIG. 4 is a Voltage waveform time chart of the main functional blocks of the discharging means shown in FIG. 3.

FIG. 4 shows a voltage waveform time chart of the main functional blocks of the discharging means in FIG. 3.

The time chart of FIG. 4 shows the waveforms of the ignition switch information $I_G$, discharge controlling signal $C_O$, comparing signal $H_O$, discharge drive signal $D_O$, retained voltage $V_{HO}$, and voltage $V_s$ across the smoothing capacitor $C_s$ for the following three states of the electric vehicle: the vehicle is running ($I_G$: ON), the vehicle is at rest ($I_G$: OFF), and the vehicle is being drawn ($I_G$: OFF).

As described above, the system 20 for controlling an electric vehicle motor according to the present invention not only performs discharge for a short time at predetermined time intervals when the ignition switch 5 is turned off, so that the vehicle stops, but also continues discharge when the deviation DV of the retained voltage $V_{HO}$ from the voltage $V_s$ which is reduced as discharge progresses exceeds the predetermined voltage $V_{HS}$, which function enables the smoothing capacitor $C_s$ to be rapidly discharged.

Even when the electric vehicle is drawn with the ignition switch 5 OFF, the deviation ΔV of the retained voltage $V_{HO}$ from the voltage $V_s$ does not exceed the predetermined voltage $V_{HS}$ because of voltage caused by the regenerative effect of the motor 3, and the smoothing capacitor $C_s$ can be prevented from being continuously discharged.

Figure 5:
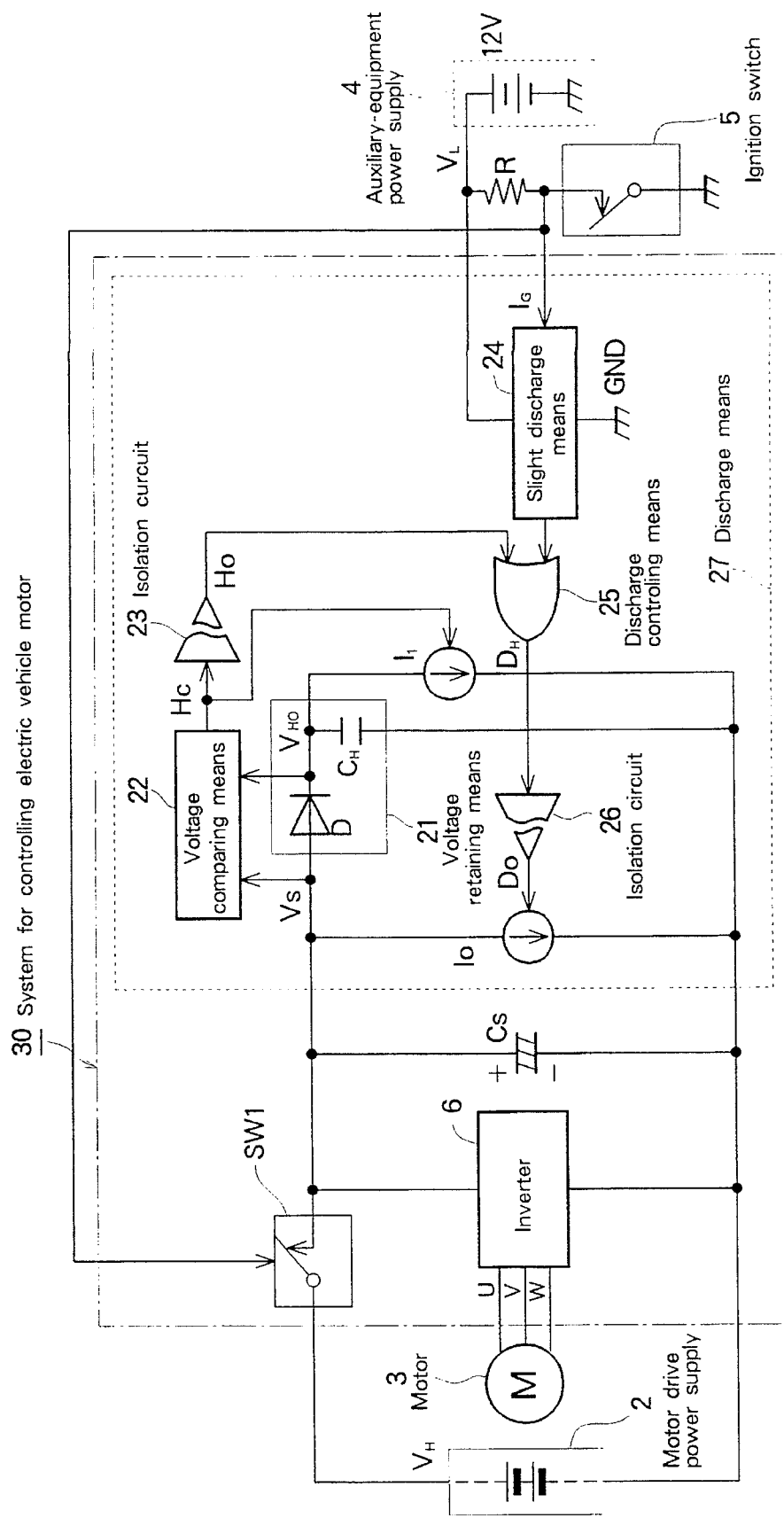
FIG. 5 is a block diagram of a third embodiment of a system for controlling an electric vehicle motor according to the present invention.

In FIG. 5, unlike the system 20 of FIG. 3, a system 30 for controlling an electric vehicle motor includes a discharging means 27 that is also provided with a retained charge reducing means (constant-current circuit $I_1$) for discharging the capacitor $C_H$.

The retained charge reducing means (constant-current circuit $I_1$), connected in parallel with a capacitor $C_H$ in voltage retaining means 21, is arranged so that the constant-current circuit $I_1$ continues to discharge the capacitor $C_H$ based on the comparing signal $H_c$ when the deviation ΔV of the retained voltage $V_{HO}$ from the voltage $V_s$ which is reduced as discharge progresses exceeds a predetermined voltage $V_{HS}$ and thus voltage comparing means 22 outputs the comparing signal $H_c$, causing the constant-current circuit $I_O$ to continuously discharge the smoothing capacitor $C_s$.

Setting constant current $I_1$ from the constant-current circuit $I_1$ to $C_H \times I_O/C_s$ enables the deviation ΔV of the retained voltage $V_{HO}$ from the voltage $V_s$ across the smoothing capacitor $C_s$, which voltage is reduced as discharge progresses, i.e., $V_{HO}-V_s$, to be maintained at a virtually constant value.

When the electric vehicle is drawn from rest or stopped contion, the discharge means 27 can detect the drawing of the electric vehicle because the voltage $V_s$ exceeds the retained voltage $V_{Ho}$ even before the smoothing capacitor $C_s$ is completely discharged.

FIG. 6 shows a voltage waveform time chart of the main functional blocks of the discharge means in FIG. 5.

The time chart of FIG. 6 shows the waveforms of the ignition switch information $I_G$, discharge controlling signal $C_O$, comparing signal $H_O$, discharge drive signal $D_O$, retained voltage $V_{HO}$, and voltage $V_s$ across the smoothing capacitor $C_s$ for the following three states of the electric vehicle: the vehicle is running ($I_G$: ON), the vehicle is at rest ($I_G$: OFF), and the vehicle is being drawn ($I_G$: OFF).

The voltage $V_s$ across the smoothing capacitor $C_s$ and the retained voltage $V_{HO}$ are reduced so that the deviation ΔV is kept nearly constant when the electric vehicle is at rest ($I_G$: OFF), while the voltage $V_s$ across the smoothing circuit $C_s$ becomes higher than the retained voltage $V_{HO}$, thereby preventing continuous discharge when the electric vehicle is drawn ($I_G$: OFF ).

If the speed of the electric vehicle varies (drawing speed is reduced) when the vehicle is drawn ($I_G$: OFF), discharge is continuously caused while speed variations continue, but discharge is restricted immediately after the speed is increased.

As described above in detail, referring to the embodiments, a system according to the present invention, comprising motor drive means, a smoothing capacitor connected in parallel with the motor drive means, switching means operating in connection with an operation switch operated by the operator, and discharging means for discharging the smoothing capacitor, opens the switching means to shut off power from the battery and activates the discharging means to rapidly discharge the smoothing capacitor, thereby reducing voltage thereacross when the ignition switch is turned off.

By being provided with draw detecting means and discharge restricting means, both of which operate based on ignition switch information and a vehicle speed signal, the system according to the present invention also exactly detects the condition of the vehicle being drawn and restricts discharge through a discharging circuit during drawing, thereby enabling heat generation to be prevented during drawing without increasing the capacity of the discharging circuit.

Furthermore, the system according to the present invention, wherein discharging means includes voltage retaining means, voltage comparing means, and slightly discharging means, uses circuits, that is, the voltage retaining means and voltage comparing means to detect the condition of the vehicle of either being at rest or being drawn, thereby eliminating the need for a specific detector and controlling means, such as a vehicle speed sensor, and enabling the discharge to be securely controlled by a simple arrangement.

Still further, the system according to the present invention, including a retained charge releasing circuit, can drive the retained charge releasing circuit and make a change in the voltage of voltage retaining means follow a change in the voltage of a smoothing capacitor to exactly detect the condition of draw, thereby restricting discharge even when an electric vehicle is drawn before discharge from the smoothing capacitor is completed.

Thus the present invention can provide a system for controlling an electric vehicle motor, which system is simply arranged and exhibits optimal discharge characteristics in accordance with the condition of an electric vehicle.

According to the first embodiment (FIG. 1), second embodiment (FIG. 3) and third embodiment (FIG. 5), the switch SW1 between the battery 2 and inverter 6 is switched ON or OFF synchronized with the ignition switch 5. However, the switch SW1 may be held in the ON condition during the regenerative condition of the motor, such as when the speed of the electric vehicle is above a predetermined speed.

We claim:

1. A system for controlling an electric vehicle motor in an electric vehicle, which system comprises motor drive means which includes a plurality of switching devices and drives the motor with power from a battery, a capacitor, connected in parallel with said motor drive means, which capacitor smoothes output from said battery, and discharging means operating in connection with switching means operated by an operator of the electric vehicle for discharging said capacitor, wherein, said discharging means comprises draw detecting means for detecting the electric vehicle being drawn and discharge restricting means for restricting the activation of said discharging means when said draw detecting means detects the electric vehicle being drawn.

2. The system for controlling an electric vehicle motor according to claim 1, wherein said draw detecting means detects the electric vehicle being drawn when said switching devices are in an off position and a vehicle speed sensor detects a vehicle speed higher than a predetermined value.

3. A system for controlling an electric vehicle motor in an electric vehicle, comprising motor drive means which includes a plurality of switching devices and drives the motor on power from a battery, a capacitor, connected in parallel with said motor drive means, which capacitor smoothes output from said battery, and discharging means operating in connection with switching means operated by an operator of the electric vehicle for discharging said capacitor, wherein, said discharging means comprises voltage retaining means for retaining voltage which is applied across said capacitor, slight discharge means for slightly discharging said capacitor when said switching means opens, voltage comparing means for comparing a voltage retained by retaining means with a current voltage applied across said capacitor, and discharge controlling means for, based on the result of the comparison by said voltage comparing means, continuing the discharge of said capacitor if said current voltage applied across said capacitor is lower than the voltage retained by said voltage retaining means.

4. A system for controlling an electric vehicle motor in an electric vehicle, which system comprises motor drive means which includes a plurality of switching devices and drives the motor with power from a battery, a capacitor, connected in parallel with said motor drive means, which capacitor smoothes output from said battery, and discharging means operating in connection with switching means operated by an operator of the electric vehicle for discharging said capacitor, wherein, said discharging means comprises voltage retaining means for retaining voltage which is applied across said capacitor, slight discharge means for slightly discharging said capacitor when said switching means opens, voltage comparing means for comparing a voltage retained by said voltage retaining means with a current voltage applied across said capacitor, discharge controlling means for, based on the result of the comparison by said voltage comparing means, continuing the discharge of said capacitor if said current voltage applied across said capacitor is lower than the voltage retained by said voltage retaining means, and retained voltage reducing means for, based on the result of the comparison by said voltage comparing means, reducing the voltage retained by said voltage retaining means if said current voltage applied across said capacitor is lower than the voltage retained by said voltage retaining means.

5. The system for controlling an electric vehicle motor according to claim 3 or 4, wherein said slight discharge means comprises an intermittent timer controlling slight discharge through said capacitor at predetermined time intervals.

6. A system for controlling an electric vehicle motor in an electric vehicle comprising, motor drive means for driving the motor with power from a battery, means for causing regenerative charging of said battery when the motor is rotated by movement of the electric vehicle without supplying power from said battery and motor drive means, a capacitor connected in parallel with said motor drive means for smoothing output from said battery, and discharging means operating in connection with switching means operated by an operator of the electric vehicle for discharging said capacitor, said discharging means including means for restricting discharging of said capacitor during regenerative charging of said battery by said means for causing regenerative charging.

7. The system for controlling an electric vehicle motor according to claim 6, wherein said means for restricting discharging includes means for restricting discharging of said capacitor when the magnitude of said regenerative charging of said battery is above a predetermined value.

8. A system for controlling an electric vehicle motor according to claim 7, wherein said predetermined value of said regenerative charging is determined according to the speed of the electric vehicle.

9. A system for controlling an electric vehicle motor according to claim 6, wherein said switching means operable by the operator of the vehicle are provided with means for selectively operating the motor, and said discharging means including means for causing capacitor discharging operation only when said switching means is operated by the operator to an open position for not operating the motor.

10. A system or controlling an electric vehicle motor according to claim 9, wherein said discharging means includes voltage retaining means for retaining voltage which is applied across said capacitor, slight discharge means for slightly discharging said capacitor when said switching means opens, voltage comparing means for comparing a voltage retained by said voltage retaining means with a current voltage applied across said capacitor, discharge controlling means for, based on the result of the comparison by said voltage comparing means, continuing the discharge of said capacitor if said current voltage applied across said capacitor is lower than the voltage retained by said voltage retaining means.

11. The system for controlling an electric vehicle motor according to claim 10, wherein said discharging means includes a retained voltage reducing means for reducing the voltage retained by said voltage retaining means if said current voltage applied across said capacitor is lower than the voltage retained by said voltage retaining means.

* * * * *